United States Patent Office 3,475,681
Patented Oct. 28, 1969

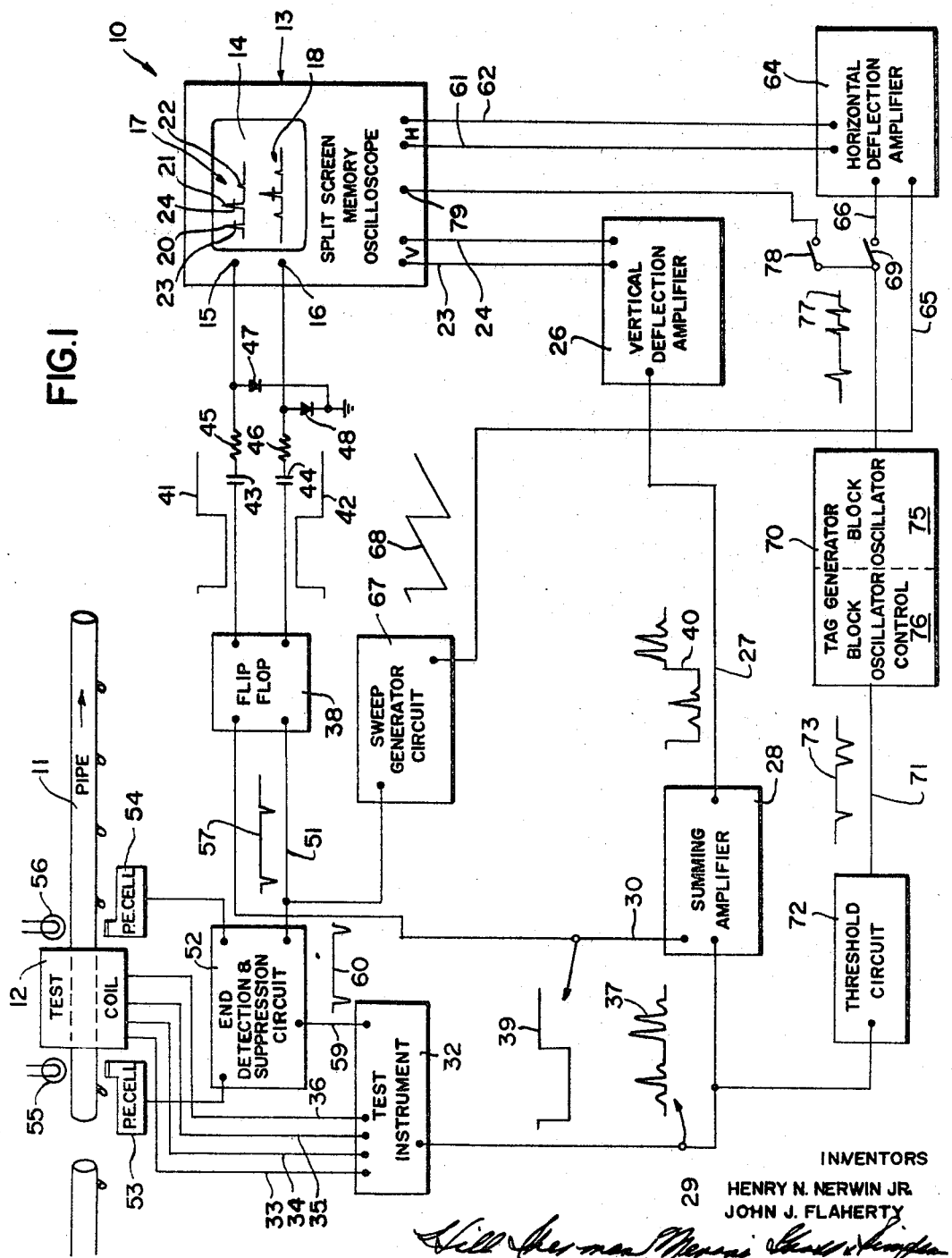

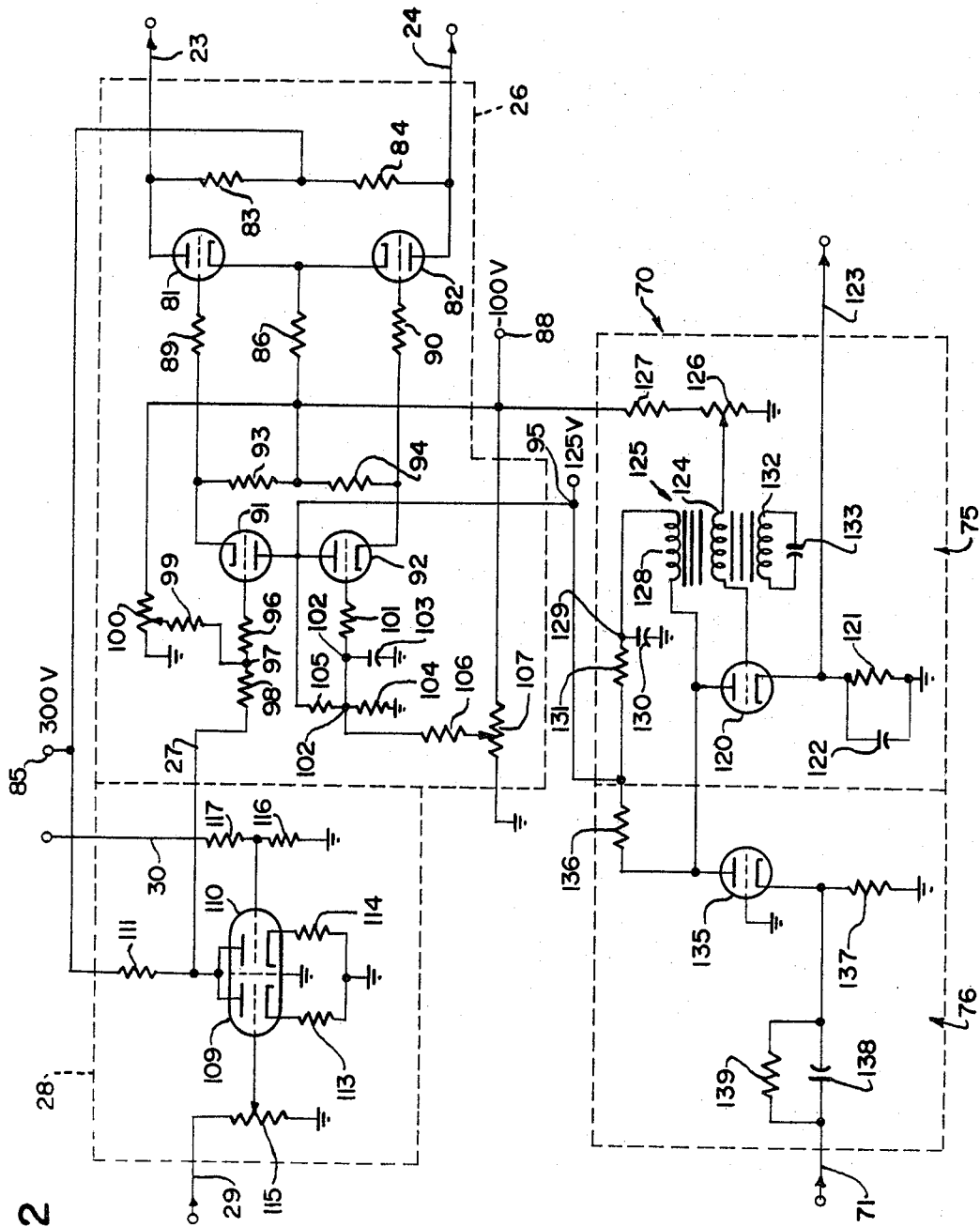

3,475,681
APPARATUS DISPLAY SYSTEM FOR PROVIDING PLURAL INDICATIONS AND THRESHOLD INDICATIONS
Henry N. Nerwin, Jr., Mount Prospect, and John J. Flaherty, Elk Grove Village, Ill., assignors to Magnaflux Corporation, Chicago, Ill., a corporation of Delaware
Filed Aug. 2, 1965, Ser. No. 476,379
Int. Cl. G01r 33/12
U.S. Cl. 324—37    9 Claims

ABSTRACT OF THE DISCLOSURE

Apparatus for testing a series of objects, especially elongated objects such as sections of pipe which are moved longitudinally through an eddy current coil or other testing device in synchronism with the horizontal movement of a spot across an oscilloscope screen, the spot being deflected vertically by defect signals. An important feature is in the use of a screen having storage characteristics and the vertical shift of the level of the indications from one scan to another so that indications from a plurality of parts can be viewed simultaneously. Another important feature is in the horizontal deflection and/or brightening of the spot when the defect signal reaches a certain threshold value.

---

This invention relates to a testing apparatus display system and more particularly to a comparatively simple but highly reliable and versatile system wherein the results of a testing operation are displayed or indicated in a manner to facilitate interpretation thereof and to obtain a high degree of accuracy.

Many features of the invention have a variety of applications, but the system as disclosed herein is particularly designed for use in non-destructive testing of elongated objects such as pipes or tubes by the eddy current method, wherein a series of objects are passed through a test coil assembly to produce electrical signals corresponding to defects. By way of example, the test coil assembly may comprise a pair of transformers having primary and secondary windings surrounding the object with the primary windings being connected to a source of alternating current and with the secondaries being connected in series opposition to produce no output signal when the portions of the object within the two transformers have the same characteristics, but producing an output signal when one of such portions has a crack, flaw or other defect therein.

Such systems have been highly effective in many applications, but the calibration thereof has been difficult and subject to inaccuracies and also it has been difficult to interpret and evaluate the test results.

In accordance with an important feature of the invention, a sweep signal is applied to horizontal deflection means of an oscilloscope to produce horizontal movement of a spot across the oscilloscope screen in synchronism with the scanning of a series of parts by a test unit with output pulses from the test unit being applied to modify the indication produced on the screen, and with a level shifting signal being applied to the vertical deflection means of the oscilloscope in synchronism with the scanning of successive parts to produce a vertical separation between indications produced from successive parts. With this arrangement, the indications produced by one part can be carefully examined during the scanning of another part, and a complete and accurate interpretation of the test results is facilitated. Ample time is provided for the interpretation of results while eliminating the need for an awkward, cumbersome and expensive pen recorder or the like. If a permanent record should be required, photographs of the screen of the oscilloscope can be readily obtained.

According to another important feature of the invention, a testing apparatus display system is provided for responding to input pulses of varying amplitude wherein a threshold circuit responsds to the input pulses to produce output signals when the amplitude thereof exceeds a certain value, and wherein the output signals from the threshold circuit are applied to an oscilloscope in a manner to modify indications produced from the input pulses. With this arrangement, calibration of the apparatus is facilitated since it is possible to obtain an immediate visual indication when the input signal exceeds the threshold value, and it is also possible to compare the threshold value with the magnitude of the indications which are produced. Further, after calibration of the apparatus, interpretation of results is greatly facilitated since the indicated magnitude of an input pulse can be more readily compared with the threshold value.

Preferably, and in accordance with a specific feature of the invention, the threshold-indicating feature is utilized in an apparatus for non-destructively testing the series of parts, and most preferably in an eddy current instrument wherein it is not possible to readily obtain an absolute calibration, and wherein the most effective calibration is obtained through the use of sample test objects having known characteristics.

In accordance with another specific feature of the invention, the threshold-indicating feature is used in combination with the level-shifting feature which is important in that adequate time is obtained for comparison of the indicated amplitude of pulses produced from defects with the threshold value as a reference.

Another specific feature of the invention relates to the use of sensing means to determine when the end of an elongated object is adjacent a test unit, and in the control of the sweep circuit of an ocilloscope therefrom.

A further specific feature of the invention relates to the use of an oscilloscope which will retain an image for a time interval of the same order of magnitude as the time interval required for scanning of a part. A long-persistence screen may be used, but preferably a memory oscilloscope is utilized, operative to display an indication indefinitely, until application of an erase signal. To obtain the level-shfting feature, a divided screen, or split screen, memory oscilloscope is used wherein an erase signal may be applied to erase one portion of the screen independently of another.

Still another feature is in the use of signals obtained from the sensing of an end of a part to operate the erasing means of a memory oscilloscope in properly synchronized relation to the scanning of a part.

A still further feature of the invention is in the development of a signal in response to an output signal from the threshold circuit and in the application of the developed signal to horizontal deflection means of the oscilloscope in a manner to obtain a horizontal line which very clearly shows the threshold level. In the alternative, the developed signal may be applied to the intensity control of the oscilloscope to produce a brightening of the spot at the threshold value. It is also possible to use both the horizontal deflection and the brightening, for additional clarity of indication.

Yet another specific feature of the invention is in the use of a blocking oscillator to provide a comparatively simple but highly reliable means for obtaining the threshold level indication.

This invention contemplates other and more specific objects, features and advantages which will become more fully apparent from the following detailed description taken in conjunction with the accompanying drawings which illustrate a preferred embodiment and in which:

FIGURE 1 is a schematic block diagram of eddy current apparatus for testing pipes or tubes, incorporating a display system constructed in accordance with the principles of this invention; and FIGURE 2 is a circuit diagram showing the circuits of a summing amplifier, a vertical deflection amplifier and a tag generator of the system shown in block form in FIGURE 1.

Reference numeral 10 generally designates eddy current apparatus for testing elongated objects such as rods, tubes or pipes, incorporating a display system constructed according to the invention.

As diagrammatically illustrated, a series of pipe sections 11 are movable one-by-one in a lengthwise direction through a test coil unit 12 which operates to develop pulses corresponding to defects in the pipe sections 11. In accordance with an important feature of the invention, a split screen memory oscilloscope 13 is used for indicating or displaying the test results. The oscilloscope 13, which is of a type available commercially, has a screen 14 so constructed that images may be retained thereon indefinitely, with grid structures behind upper and lower half sections thereof and with circuitry such that a trace on the upper half section may be erased by application of a signal to a terminal 15 while a trace on the lower half section may be erased by application of a signal to a terminal 16.

In the testing operation, a spot is moved horizontally across the screen 14 in synchronism with the movement of a pipe section through the test coil unit 12 with the spot being deflected vertically in response to pulses produced by defects in the pipe section. As illustrated, an indication 17 is shown being produced on the upper half section of the screen 14 by movement of a pipe section through the test coil unit 12, while an indication 18 produced from a preceding pipe section is retained on the lower portion of the screen 14.

After the illustrated pipe section has moved through the test coil 12, another pipe section is moved therethrough and another indication is produced on the lower portion of the screen 14, after erasure of the previous indication. Thus, the testing can be performed continuously while the complete indication from the testing of a pipe section is on display for evaluation.

In accordance with another important feature of the invention the indications on the oscilloscope screen 14 are modified when the pulses developed by the test coil unit 12 exceed a certain threshold value, which may be adjusted according to testing conditions. With this feature, the operator can readily determine when the threshold value has been exceeded, the threshold circuit has fired, and the reject relay has operated. The feature thus simplifies evaluation, and is also important in facilitating initial calibration of the instrument.

In accordance with a specific feature, the modification of the indication is such as to indicate the threshold level relative to the levels of pulses applied to the system. In particular, three "pip" indications 20, 21 and 22 are shown being produced in the indication 17 on the upper half section of the screen 14, the first two indications 20 and 21 being of relatively large amplitude and the third indication 22 being of small amplitude. As illustrated, horizontal cross lines 23 and 24 appear on the pip indications 20 and 21, at a certain distance above the base line of the trace, while no cross line is developed on the indication 22, which is of lower amplitude. Such cross lines or "tags" indicate that the threshold level has been exceeded, and also indicate the level as compared to the magnitude of indications being produced.

To produce the vertical "pip" indications and also to obtain the vertical separation of the images 17 and 18, vertical deflection plates of the oscilloscope 13 are connected through lines 23 and 24 to output terminals of a vertical deflection amplifier 26 having an input connected through a line 27 to the output of a summing amplifier 28 which has two inputs connected to lines 29 and 30. Line 29 is connected to the output of a test instrument 32 which is connected through lines 33–36 to the test coil unit 12. The test coil unit 12 may comprise, for example, two transformers spaced axially relative to the pipe 11, having primary windings connected through lines 33 and 34 to an AC current source within the instrument 32 and having secondary windings connected in series opposition and through lines 35 and 36 to amplifier and signal processing circuitry within the test instrument 32. When the portions of the pipe within the two transformers have the same characteristics, the voltages induced in the secondary windings cancel and no output signal is obtained. However, when the characteristics are not identical, as when a flaw passes through the test coil unit, an output pulse is obtained which is amplified within the test instrument 32 and applied through line 29 to the summing amplifier. For example, a signal having a wave form as indicated by reference numeral 37 may be produced.

The second input line 30 to the summing amplifier 28 is connected to an output terminal of a bistable multivibrator or flip-flop circuit 38 which is triggered into one condition when one pipe section is being tested and which is triggered into a second condition when a succeeding pipe section is being tested. Thus, a square wave signal as indicated by reference numeral 39 is applied through the line 30 to the summing amplifier 28.

When the two signals 37 and 39 are combined in the summing amplifier 28, the result is a signal on the line 27 as indicated by reference numeral 40, wherein the pulses produced from testing of one pipe section have a different base level than that of the pulses produced from testing a preceding or succeeding pipe section. When the composite signal is applied through the vertical deflection amplifier 26 to the vertical deflection plates of the oscilloscope 13, the indications 17 and 18 are produced, assuming the application of suitable horizontal deflection voltages as hereinafter described.

The flip-flop 38 also functions to apply signals for erasure of the lower and upper half sections of the oscilloscope screen 14. In particular, output terminals of the flip-flop 38, operative to develop square wave signals as indicated by reference numerals 41 and 42, are connected through capacitors 43 and 44 and resistors 45 and 46 to the terminals 15 and 16 of the oscilloscope, such terminals being also connected through diodes 47 and 48 to ground. The purpose of this circuit arrangement is to effectively connect the terminals 15 and 16 to ground at appropriate times, which is required for erasure in at least certain types of memory oscilloscopes. In operation, when the wave form applied to capacitor 43 swings in a positive direction, the diode 47 is rendered conductive to discharge the capacitor 43 and to also act as a switch providing a low impedance between terminal 15 and ground. The erasure is thus effected rather rapidly and after the capacitor 43 is fully discharged, the erasure does not continue, so that the desired indication can be produced on the upper half of the oscilloscope screen 14. The operation of the other circuit is, of course, the same.

To trigger the flip-flop 38 from one condition to the other, a trigger input thereof is connected through a line 51 to an output terminal of an end detection and suppression circuit 52 having input terminals connected to photoelectric cells 53 and 54, preferably solid state cells. The cells 53 and 54 are positioned on the opposite side of the pipe from light sources 55 and 56 and are also positioned on opposite sides of the test coil unit 12 such that the light path from source 55 to photocell 53 is broken as the leading end of a pipe section approaches the test coil unit 12 while the path of light from source 56 to cell 54 is broken as the leading end of the pipe emerges from the test coil unit 12. When the trailing end of the pipe enters the test coil unit 12 light is again transmitted to cell 53 from source 55 and likewise when the trailing end of the pipe emerges from the test coil unit 12, the light is again applied to the cell 54 from the source 56.

The circuit 52 is arranged to develop a negative pulse signal as the trailing end of the pipe emerges from the test coil unit 12 to allow transmission of light to the cell 54 from the source 56, thus developing a signal as indicated by reference numeral 57. Thus, the erasure of one section of the oscilloscope screen and the level shift are accomplished, with the circuit being then in condition for testing another pipe section. It is noted, however, that the flip-flop 38 could be triggered in response to a signal from the photocell 53, when the leading edge of a pipe section interrupts the transmission of light thereto, since the erasure and the level shift can be accomplished quite rapidly.

The end detection and suppression circuit 52 also functions to apply a signal through line 59 to the test instrument 32, having a wave form as indicated by reference numeral 60. This signal is so developed and applied that the test instrument 32 is disabled when light is transmitted to either of the photocells 53 and 54, and the test instrument 32 is operative only when the paths of light to both cells are broken, i.e., when there is a pipe section within the test coil 12.

Horizontal deflection plates of the oscilloscope 13 are connected through lines 61 and 62 to a horizontal deflection amplifier 64 having two inputs connected to lines 65 and 66. Line 65 is connected to the output of a sweep generator circuit 67 having an input connected to the line 51 to be triggered at the same time that the flip-flop 38 is triggered and to generate a sawtooth wave as indicated by reference numeral 68 so as to cause the spot to move across the screen 14 in synchronism with the movements of the pipe sections through the test coil 12.

Line 66 is connected through a switch 69 to the output of a tag generator circuit 70 having an input connected through a line 71 to the output of the threshold circuit 72 having an input connected to the line 29 to be connected to the output of the test instrument 32. In operation, when the pulses applied to the threshold circuit 72 from the test instrument exceed a certain amplitude, the threshold circuit generates pulses which are of negative polarity in the illustrated system and of substantially fixed amplitude, as shown by the wave form 73 on the drawing. The tag generator 70 comprises a blocking oscillator section 75 and a control section 76 operable to apply the pulses from the threshold circuit 72 to trigger the blocking oscillator section 75 and to cause it to generate in response to each pulse a wave form which swings from zero in a positive direction then back in a negative direction and then back to zero, the wave form being as indicated by reference numeral 77. When the wave form so produced is applied to the horizontal deflection amplifier 64 the result is a rapid horizontal swing in the spot at a level as determined by the threshold circuit 72, to thereby generate the tags as previously discussed.

The output of the tag generator 70 may also be applied through a switch 78 to a Z-axis input terminal 79 of the oscilloscope 13 to cause a momentary brightening of the spot during the positive portions of the wave forms. This feature may be used in combination with the horizontal deflection, to enhance the threshold indication obtained therefrom, or it may be used alone to indicate the threshold by the brightening of the spot.

Referring now to FIGURE 2, the vertical deflection amplifier 26 comprises a pair of triodes 81 and 82 having plates connected to the lines 23 and 24 and also connected through resistors 83 and 84 to a power supply terminal 85. The cathodes of the triodes 81 and 82 are connected together and through a resistor 86 to a power supply terminal 88 to which a negative voltage on the order of minus 100 volts may be applied. The grids of the triodes 81 and 82 are connected through resistors 89 and 90 to the cathodes of a pair of triodes 91 and 92 and also through resistors 93 and 94 to the terminal 88. The plates of the triodes 91 and 92 are connected together and to a power supply terminal 95 to which a positive voltage may be applied somewhat less than that applied to the terminal 85. For example, a positive voltage of 125 volts may be applied to terminal 95 while a positive voltage of 300 volts may be applied to terminal 85.

The grid of the triode 91 is connected through a resistor 96 to a circuit point 97 connected through a resistor 98 to the line 27 from the summing amplifier 28 and also connected through a resistor 99 to the movable contact of a potentiometer 100 connected between ground and the power supply terminal 88. The potentiometer 100 operates as a position centering control.

The grid of the triode 92 is connected through a resistor 101 to a circuit point 102 connected through a capacitor 103 and a resistor 104 to ground, through a resistor 105 to the power supply terminal 95, and through a resistor 106 to the movable contact of a potentiometer 107 connected between ground and the power supply terminal 88. The potentiometer 107 operates as a position control.

It will be noted that the triodes 91 and 92 operate as cathode-followers to apply DC voltages in the grid circuits of the triodes 81 and 82 proportional to the DC voltages applied to the grids of the triodes 91 and 92, the triodes 81 and 82 being operated as DC amplifiers to permit stable and accurate control of the levels of the voltages applied to the vertical deflection plates, and to thus affix the positions of the vertically separated images or indications 17 and 18. At the same time, the amplifier has high frequency response characteristics sufficient to accurately produce the "pip" indications on the screen 14.

The summing amplifier 28 comprises a pair of triodes 109 and 110 having plates connected together and through a common resistor 111 to the power supply terminal 85 and having cathodes connected through bias resistors 113 and 114 to ground. The grid of the triode 109 is connected to the movable contact of a potentiometer 115 connected between ground and the line 29 connected to the output of the test instrument 32. The grid of the triode 110 is connected through a resistor 116 to ground and through a resistor 117 to the line 30 connected to an output of the flip-flop 38. With this arrangement, the signals applied to the grids of the triodes 109 and 110 are combined through the common plate resistor 111, but the inputs are isolated. It will be noted that there is direct DC coupling between the plates of the triodes 109 and 110 and the grid of the triode 91, triode 91 being directly coupled to triodes 81 and 82 as above described.

The blocking oscillator section 75 of the tag generator 70 comprises a triode 120 having a cathode connected through a resistor 121 and a capacitor 122 to ground, the cathode being also connected to an output line 123 which is connected to the switches 69 and 78 shown in FIGURE 1. The grid of the triode 120 is connected through a winding 124 of a transformer 125 to the movable contact of an adjustable bias potentiometer 126 connected at one end to ground and at its other end through resistor 127 to the power supply terminal 88. The plate of the triode 120 is connected through a winding 128 of the transformer 125 to a circuit point 129 which is connected through a capacitor 130 to ground and through a resistor 131 to the power supply terminal 95. An additional winding 132 of the transformer 125 is connected to a capacitor 133 to define a resonant circuit.

In operation, potentiometer 126 is adjusted to apply a relatively large negative bias to the grid of the triode 120 sufficient to prevent sustained oscillation of the circuit. When a pulse is applied from the threshold circuit through the blocking oscillator control 76, the potential of the plate of the triode 120 moves in a negative direction which has the effect of producing, through inductive coupling of windings 128 and 124, a positive-going voltage at the grid of the triode 120, to thus increase conduction of the triode 120 and increase the current through the winding 128. Through inductive coupling, the potential of the grid is further increased in a positive direction, to further increase conduction. As a result of this action, the current builds up in the triode 120 very rapidly. A certain limiting or saturation point will be reached, however, and at that point the resonant circuit defined by winding 132 and capacitor 133 will take over and cause a generally sinusoidal swing, moving the potential of the grid in a negative direction to move the tube toward a cut-off condition. After one or more cycles, depending upon the bias and the effective "Q" of the circuit, the oscillation stops and the initial condition is restored. As a result, an output signal as above described is developed on the line 123 which is connected to the cathode.

It may be noted that the oscillator 75 differs from other types of blocking oscillators in which a large negative grid-cathode bias is developed from an initial large pulse of current flow, and the illustrated circuit may be operated to produce a damped oscillatory wave having several cycles of decreasing amplitude which is desirable in many circumstances. However, a more conventional type of blocking oscillator may be used, if desired.

The control section 76 comprises a triode 135 having a plate connected to the plate of triode 120 and also connected through a resistor 136 to the power supply terminal 95. The grid of the triode 135 is grounded, while the cathode is connected through a resistor 137 to ground and also through the parallel combination of a capacitor 138 and a resistor 139 to the line 71.

In operation, when a negative pulse is applied on line 71 from the threshold circuit 72, the potential of the cathode of the triode 135 is moved in a negative direction to increase the current through the tube, and to develop an increased current through the transformer winding 128, to thereby initiate the operation as above described.

In some cases, a threshold circuit may be used which produces a positive output pulse. In such cases, the connection may be made to the grid of the triode 135, rather than to the cathode as illustrated.

By way of illustrative example and not by way of limitation, the circuit components may have the following values:

| Reference numeral: | Value |
| --- | --- |
| 83 | 33K |
| 84 | 39K |
| 86 | 15K |
| 89 | 100 |
| 90 | 100 |
| 93 | 39K |
| 94 | 39K |
| 96 | 100 |
| 98 | 150K |
| 99 | 150K |
| 100 | 50K |
| 101 | 100 |
| 104 | 120K |
| 105 | 1.5M |
| 106 | 240K |
| 107 | 50K |
| 111 | 33K |
| 113 | 1K |
| 114 | 1K |
| 115 | 1.5M |
| 116 | 10K |
| 117 | 1.2M |
| 121 | 100 |
| 126 | 5K |
| 127 | 47K |
| 131 | 100 |
| 136 | 4.7K |
| 137 | 15K |
| 139 | 220K |
| 103 | microfarads .01 |
| 122 | do .05 |
| 130 | do .1 |
| 133 | do 2 |
| 138 | do .01 |

We claim as our invention:

1. In a display system in apparatus for nondestructive testing of a series of parts including a test unit arranged to develop an output signal having pulses corresponding to defects in the part and means for effecting relative movement between the parts and said test unit to scan the parts one-by-one, an oscilloscope having a screen and horizontal and vertical deflection means for controlling the position of an indicating spot on said screen, sweep circuit means arranged to apply a sweep signal to said horizontal deflection means to produce horizontal movement of said spot across said screen in synchronism with the scanning of each part, means for applying said output pulses from said test unit to said oscilloscope to modify the indication produced on said screen concurrently with said pulses, and means for applying a signal to said vertical deflection means having a level shifting with the scanning of successive parts to produce a vertical separation between indications produced from successive parts.

2. In a display system in apparatus for nondestructive testing of a series of elongated parts including a test unit arranged to develop an output signal having pulses corresponding to defects in the parts, and means for moving the parts lengthwise one-by-one past said test unit, an oscilloscope having a screen and horizontal and vertical deflection means for controlling the position of an indicating spot on said screen, sweep circuit means arranged to apply a sawtooth wave to said horizontal deflection means, means responsive to movement of the end of a part to a certain position to trigger said sweep circuit means and effect horizontal movement of said spot across said screen in synchronism with the scanning of each part, means for applying said output pulses from said test unit to said oscilloscope to modify the indication produced on said screen concurrently with said pulses, flip-flop means for applying a square wave signal to said vertical deflection means, and means responsive to movement of the end of a part to a certain position to trigger said flip-flop means and to produce a vertical separation between indications produced from successive parts.

3. In a display system in apparatus for nondestructive testing of a series of parts including a test unit arranged to develop an output signal having pulses corresponding to defects in the part and means for effecting relative movement between the parts and said test unit to scan the parts one-by-one, a split screen memory oscilloscope having a screen divided into separately erasable sections and horizontal and vertical deflection means for controlling the position of an indicating spot on said screen, sweep circuit means arranged to apply a sweep signal to said horizontal deflection means to produce horizontal movement of said spot across said screen in synchronism with the scanning of each part, means for applying said output pulses from said test unit to said oscilloscope to modify the indication produced on said screen concurrently with said pulses, means for applying a signal to said vertical deflection means having a level shifting with the scanning of successive parts to produce indications on said separately erasable sections from successive parts, and means synchronized with the scanning of successive parts for erasing each of said sections prior to production of an indication thereon.

4. In a display system in apparatus for nondestructive testing of a series of elongated parts including a test unit arranged to develop an output signal having pulses corresponding to defects in the parts, and means for moving the parts lengthwise one-by-one past said test unit, sensing means adjacent said test unit for developing a control signal in response to movement of the leading end of a part in proximity thereto, an oscilloscope having a screen and horizontal and vertical deflection means for controlling the position of an indicating spot on said screen, sweep circuit means controlled from said control signal and arranged to apply a sawtooth wave to said horizontal deflection means to produce horizontal movement of said spot across said screen in synchronism with the scanning of each part, means for applying said output pulses from said test unit to said oscilloscope to modify the indication produced on said screen concurrently with said pulses, and means controlled from said control signal for applying a signal to said vertical deflection means having a level shifting with the scanning of successive parts to produce a vertical separation between indications produced from successive parts.

5. In a display system in apparatus for nondestructive testing of a series of parts including a test unit arranged to develop an output signal having pulses corresponding to defects in the parts, and means for effecting relative movement between the parts and said test unit to scan the parts one-by-one, an oscilloscope having a screen and horizontal and vertical deflection means for controlling the position of an indicating spot on said screen, sweep circuit means arranged to apply a sweep signal to said horizontal deflection means to produce horizontal movement of said spot across said screen in synchronism with the scanning of each part, a summing amplifier having an output coupled to said vertical deflection means and having a pair of inputs, means for applying said output pulses from said test unit to one of said inputs to produce pip indications on said screen concurrently with said pulses, and means for applying to the other of said inputs a signal having a level shifting with the scanning of successive parts to produce a vertical separation between indications produced from successive parts.

6. In a display system in apparatus for non-destructive testing of a series of parts including a test unit arranged to develop an output signal having pulses corresponding to defects in the parts, and means for effecting relative movement between the parts and said test unit to scan the parts one-by-one, an oscilloscope having a screen and horizontal and vertical deflection means for controlling the position of an indicating spot on said screen, sweep circuit means arranged to apply a sweep signal to said horizontal deflection means to produce horizontal movement of said spot across said screen in synchronism with the scanning of each part, means for applying said output pulses from said test unit to said oscilloscope to produce defect indications on said screen, means for applying a signal to said vertical deflection means having a level shifting with the scanning of successive parts to produce a vertical separation between indications produced from successive parts, a threshold circuit responsive to said output pulses from said test unit to produce output signals when the amplitude thereof exceeds a certain value, and means responsive to said output signals from said threshold circuit for applying signals to said oscilloscope to modify said defect indications.

7. In a display system as defined in claim 6, the last-mentioned means comprising means responsive to said output signals to instantaneously brighten said pip indications and to indicate said threshold value thereon.

8. In a display system as defined in claim 6, the last-mentioned means comprising means for applying signals to said horizontal deflection means to produce horizontal lines along said vertical pip indications and to indicate said threshold value thereon.

9. In a display system as defined in claim 6, the last-mentioned means comprising means responsive to said output signals to instantaneously brighten said pip indications, and means responsive to said output signals to produce horizontal lines along said vertical pip indications, thereby to produce horizontal deflections of increased brightness on said pip indications to indicate said threshold value.

References Cited
UNITED STATES PATENTS

| | | | |
|---|---|---|---|
| 2,349,687 | 5/1944 | Williams | 324—121 X |
| 2,490,530 | 12/1949 | Loughlin | 324—102 |
| 2,611,811 | 9/1952 | Yates | 324—140 |
| 3,124,884 | 3/1964 | Capecelatro | 324—88 |
| 3,293,543 | 12/1966 | Nelson et al. | 324—34 |

RUDOLPH V. ROLINEC, Primary Examiner

A. E. SMITH, Assistant Examiner

U.S. Cl. X.R.

315—18; 324—40, 102, 121; 328—231